(12) United States Patent
Guinan et al.

(10) Patent No.: US 7,391,422 B1
(45) Date of Patent: Jun. 24, 2008

(54) METHOD AND APPARATUS FOR PAINTING GROUPS OF OBJECTS

(75) Inventors: Frank Guinan, Mountain View, CA (US); Paul J. Asente, La Honda, CA (US); Teri Pettit, Menlo Park, CA (US); Darin Tomack, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/569,166

(22) Filed: May 11, 2000

Related U.S. Application Data

(63) Continuation of application No. 09/470,255, filed on Dec. 22, 1999, now abandoned.

(51) Int. Cl.
*G09G 5/00* (2006.01)

(52) U.S. Cl. .............. 345/581; 345/582; 345/583; 345/619; 345/441; 345/641

(58) Field of Classification Search .......... 345/441, 345/641, 646–647; 715/863
See application file for complete search history.

(56) References Cited

U.S. PATENT DOCUMENTS

| | | | |
|---|---|---|---|
| 5,182,548 A | | 1/1993 | Haeberli |
| 5,428,722 A | | 6/1995 | Marsh et al. |
| 5,485,565 A | | 1/1996 | Saund et al. |
| 5,611,036 A | * | 3/1997 | Berend et al. ............... 345/441 |
| 5,619,633 A | | 4/1997 | Turner |
| 5,767,860 A | | 6/1998 | Zimmer et al. |
| 5,835,086 A | | 11/1998 | Bradstreet et al. |
| 5,870,100 A | | 2/1999 | DeFreitas |
| 5,872,573 A | | 2/1999 | Adegeest |
| 5,903,274 A | | 5/1999 | Gibson et al. |
| 5,946,696 A | | 8/1999 | Young |
| 5,999,190 A | * | 12/1999 | Sheasby et al. ............. 345/589 |
| 6,011,536 A | | 1/2000 | Hertzmann et al. |
| 6,067,094 A | * | 5/2000 | Schuster ..................... 345/441 |
| 6,072,501 A | | 6/2000 | Bier |
| 6,130,676 A | | 10/2000 | Wise et al. |
| 6,201,549 B1 | * | 3/2001 | Bronskill .................... 345/441 |
| 6,310,622 B1 | | 10/2001 | Asente |
| 6,317,142 B1 | * | 11/2001 | Decoste et al. ............. 345/594 |
| 6,340,981 B1 | * | 1/2002 | Graham et al. ............. 715/863 |

(Continued)

FOREIGN PATENT DOCUMENTS

EP   0 566 294 A2   10/1993

OTHER PUBLICATIONS

CorelDraw 9 for Windows: Visual QuickStart Guide, Publisher: Peachpit Press, Jul. 6, 1999, Chapters 4, 14-16.*

(Continued)

*Primary Examiner*—Jin-Cheng Wang
(74) *Attorney, Agent, or Firm*—Fish & Richardson P.C.

(57) ABSTRACT

Methods and apparatus, including computer program apparatus, implementing techniques for processing digital artwork. In one aspect, the techniques process aggregations of artwork where both the aggregation and at least some of the aggregated artwork have attached styles. The techniques handle various combinations of conditions resulting in applying style elements to the aggregation before or after applying style elements to underlying artwork. In another aspect, the techniques implement editable path objects having multiple attached fills and/or strokes. The techniques provide user interfaces for using the foregoing features.

18 Claims, 7 Drawing Sheets

U.S. PATENT DOCUMENTS

| | | | |
|---|---|---|---|
| 6,346,948 B1 | | 2/2002 | Evans et al. |
| 6,373,490 B1 | * | 4/2002 | Bendiksen et al. ........... 345/441 |
| 6,466,214 B1 | * | 10/2002 | Sheasby et al. ............. 345/473 |
| 6,469,723 B1 | | 10/2002 | Gould et al. |
| 6,549,212 B1 | | 4/2003 | Janzen |
| 6,621,504 B1 | | 9/2003 | Nadas et al. |
| 6,628,295 B2 | * | 9/2003 | Wilensky ..................... 345/594 |
| 6,633,300 B1 | * | 10/2003 | Tomack et al. ............... 345/581 |
| 6,765,589 B1 | * | 7/2004 | Georgiev et al. ............. 345/646 |
| 6,870,550 B1 | | 3/2005 | Schuster et al. |
| 6,919,888 B1 | * | 7/2005 | Perani et al. ................ 345/420 |
| 7,126,609 B1 | | 10/2006 | Asente et al. |

OTHER PUBLICATIONS

Adobe Streamline 4.0 [online]. CNET [retrieved on Jun. 22, 2006]. Retrieved from the Internet: http://www.download.com/Adobe-Streamline/3000-2187_4-893483.html.

CorelDRAW Tips [online]. SummaDirect [retrieved on Jun. 22, 2006]. Retrieved from the Internet: http://www.summadirect.com/tips/tip7.html.

Staff, D., Corel WordPerfect Suite 2000 and CorelDraw 9 Release Press Conference [online]. Published in Issue 40 of *Linux Gazette*, Mid-Apr. 1999 [retrieved on Jun. 22, 2006]. Retrieved from the Internet: http://linuxgazette.net/issue40/staff.html.

"Adobe Photoshop, Beyond the Basics", 1993, Adobe Systems Incorporated, Version 2.5 for Windows.

Grace Au, et al. "Visual Interactive Modelling: A Pictorial Simulation Specification System", 1996, European Journal of Operational Research, pp. 14-26.

RoseAnn Alspektor, "Autodesk Moves to 2D Desktop Video Part I: What is the Autodesk Animator?", Nov. 1989, Cadence, v4, n11, pp. 102-107.

Wendell Benedetti, "Removing Distracting Elements in a Composition", Mar. 1999, Petersen's Photographic, 27, 11, D14 (2).

Michael Murie, "Painter's Simple Toolbox Brings Real-Life Art to Mac", Sep. 24, 1991, MacWEEK, v5, N32, pp. 43(3).

Sharyn Venit, "Arts & Letters Graphics Editor Broadens Design Perspective", Aug. 1991, PC-Computing, v4, n8, pp. 68(2).

Marc Alder, "Learning Windows Part V: Exploring the Graphics Device Interface", Mar. 1991, Microsoft Systems Journal, v6, n2, pp. 75(14).

Rebecca Gulick, "New Apps Take Shape as 3-D, Painting Collide", Jul. 29, 1996, MacWEEK, v. 10, n29m pp. 1(2).

"Adobe FrameMaker User Guide 5.5", Adobe Systems Incorporated, 1997, Chapter 4 and 8.

Clare, et al. "User's Guide for NCAR GKS-0A Graphics", National Center for Atmospheric Research, 1987-1996, 15 pages.

Seitz, et al. "Plenoptic Image Editing", Computer Sciences Department, University of Wisconsin, 1998, pp. 1-8.

Winkenbach, et al. "Computer-Generated Pen-and-Ink Illustration", Department of Computer Science & Engineering, University of Washington, Technical Report 94-01-08b, Jun. 23, 1994, 22 pages.

\* cited by examiner

METHOD AND APPARATUS FOR PAINTING GROUPS OF OBJECTS

This application is a continuation (and claims the benefit of priority under 35 USC 120) of U.S. application Ser. No. 09/470,255 filed Dec. 22, 1999 now abandoned.

The present invention relates to computer graphics.

BACKGROUND

Computer programs can be used to produce graphical images that can be rendered and displayed on an output device. Two such classes of programs are illustration applications and animation applications. An illustration application can be used to generate original graphics or combine original and existing graphics to produce a graphics image (an electronic document or illustration) that can be displayed on a static output device. An animation application can be used to produce a composition that includes graphics that can be animated using one or more effects to produce a result that can be played on a dynamic output device.

Illustrations and compositions produced using conventional illustration and animation applications include simple objects that are combined to form a final illustration or composition. A simple object can be a path, text, or other vector art object or an image art object and typically includes several properties. Properties can include paint effects such as strokes and fills for paths, vector effects such as zig-zag and scale, color blending effects such as transparency and darkening, and image effects such as fade, blur, and watercolor.

Two basic properties of a simple vector object are its stroke and fill attributes. A stroke is a representation that follows the outline of a path. Strokes can have attributes such as color, width and dash pattern. For example, in the Adobe Illustrator® program, available from Adobe Systems Incorporated of San Jose, Calif., a stroke can be a solid color, a pattern or a brush and can include attributes such as weight, cap, join and dashed. A fill is an instruction for painting the interior of a path with a solid or variegated color, such as a repeating pattern, a color gradation or a randomized arrangement. A fill might be a solid color, a gradient, a gradient mesh or a pattern. In conventional illustration and animation programs, every simple object can have a single stroke and a single fill.

When objects are combined—into a layer, for example—the rendered appearance of the objects can be affected by properties attached to the combination. Otherwise, objects are typically rendered for display in accordance with their individual properties.

SUMMARY

In one aspect, the invention provides a computer-implemented application for applying a style to an aggregation. A style includes a set of operations to be applied to artwork including a set of pre-paint operations followed by a set of paint operations as modified by the pre-paint operations. The method includes receiving an aggregation, the aggregation comprising one or more simple objects. The simple objects include at least a first object having an object style. The object style includes a set of pre-paint operations followed by a set of paint operations. An aggregation style is received and applied to the aggregation including applying at least one of the operations of the aggregation style to the first object before applying all operations of the object style to the first object.

In another aspect the invention provides a method for displaying style information including displaying artwork comprising a hierarchy of one or more aggregations, receiving a user input where the input identifying a leaf object in the artwork. The leaf object is a simple object containing no other objects, having one or more aggregation ancestors in the hierarchy and having properties. Each of the aggregation ancestors has an ancestor style. The method includes displaying a set of properties of the leaf object and the styles of the aggregation ancestors of the leaf object.

In another aspect the invention provides a method for displaying property information about a selected simple artwork object and includes displaying a detailed representation of style properties of the simple object while displaying a succinct representation of styles of artwork aggregations that affect the appearance of the simple object.

In another aspect, the invention provides a method for editing an electronic document that includes a simple artwork object and includes associating with one artwork object two or more stroke attributes.

In another aspect, the invention provides a method for editing an electronic document that includes a simple artwork object and includes associating with one artwork object two or more fill attributes.

In another aspect, the invention provides a method for editing an electronic document that includes an artwork object and includes associating with one artwork object two or more stroke attributes and two or more fill attributes.

In another aspect, the invention provides a method for editing an electronic document that includes an artwork object. The artwork object has a first attribute and one or more other attributes. The first attribute is either a fill attribute or a stroke attribute. The other attributes are either fill or stroke attributes. The method includes receiving a user input selecting for the first attribute an ordinal position among the other attributes where the ordinal position determines when the first attribute is applied in relation to the other attributes when the artwork object is rendered.

In another aspect, the invention provides a method of editing an electronic document and includes identifying one or more objects to be included in an aggregation, one or more of the objects including an associated object style and defining an aggregation style including one or more operations to be applied to the aggregation to produce a renderable representation of the aggregation including identifying a time to apply the object style to an object in the aggregation.

In another aspect, the invention provides a method for editing an electronic document that includes an artwork object includes associating a named style with the artwork object, the named style including an effect and rendering the artwork object with the named style.

In another aspect, the invention provides a method for defining a named style for artwork in a computer graphics system where the method includes including an effect in the named style.

In another aspect, the invention provides a method for editing an electronic document. The method includes applying a vector operation to a non-vector artwork object to produce a renderable representation of the non-vector artwork object without modifying the underlying non-vector artwork object.

In another aspect, the invention provides a method for editing digital graphics in response to user input and includes receiving a user selection applying a style change to an aggregation, the aggregation being an aggregation of two or more other artwork objects and automatically determining whether to apply the style change to the aggregation as an aggregate or to the other artwork objects within the aggregation.

In another aspect, the invention provides a method for editing digital graphics in response to user input and includes receiving a user selection of a first artwork object having a first shape and a first paint style and a second artwork object having a second shape and a second paint style, receiving a user request to generate a blend between the first object and the second object, generating intermediate objects having shapes changing from the first shape to the second shape and having paint styles changing from the first paint style to the second paint style. The intermediate paint styles is constructed of two layers. The first layer has the first paint style and the second layer has the second paint style. The top one of the two layers has a transparency. The blend effect is created by varying the transparency of the top layer from opaque to transparent.

In another aspect, the invention provides a method for editing an electronic document and includes applying a recipe of vector effects to an original path in an electronic document and displaying a first modified path, being the original path as modified by the recipe, rather than the original path, when rendering the electronic document.

In another aspect, the invention provides a method for editing an electronic document and includes automatically reapplying multiple vector effects to a path when a user changes the path.

In another aspect, the invention provides a method for editing an electronic document and includes automatically reapplying multiple vector effects to a path when a user changes any parameter of any of the multiple vector effects.

In another aspect, the invention provides a method for editing an electronic document and includes automatically reapplying multiple vector effects to a path when a user changes an order of application of the multiple vector effects.

In another aspect, the invention provides a method for editing an electronic document and includes attaching an effect to a first aggregation. An aggregation is an aggregate of two or more other objects. The effect is an operation that can be applied to an object having a visual appearance defined by source data to change the visual appearance without changing the source data.

In another aspect, the invention provides a method for processing digital graphics and includes placing a content proxy as an operation in an ordered set of operations to be applied to an aggregation where an aggregation is an aggregate of two or more other objects and performing the operations in order on the aggregation including applying the content proxy operation at a time indicated by the order.

In another aspect, the invention provides a system operable to have multiple operations attached to a graphic object and includes a method for creating an operation. The method includes steps of including in a definition of the operation a preferred position of the operation in an ordered set of multiple operations.

In another aspect, the invention provides a method for inserting an operation into a set of attached operations and includes receiving an input identifying a first operation to be added to an ordered set of multiple operations and placing the first operation in a position in the order according to a preferred position defined for the first operation.

These and other advantages will be readily apparent from the disclosure provided herein and the attached Figures.

DETAILED DESCRIPTION

Figure 1:
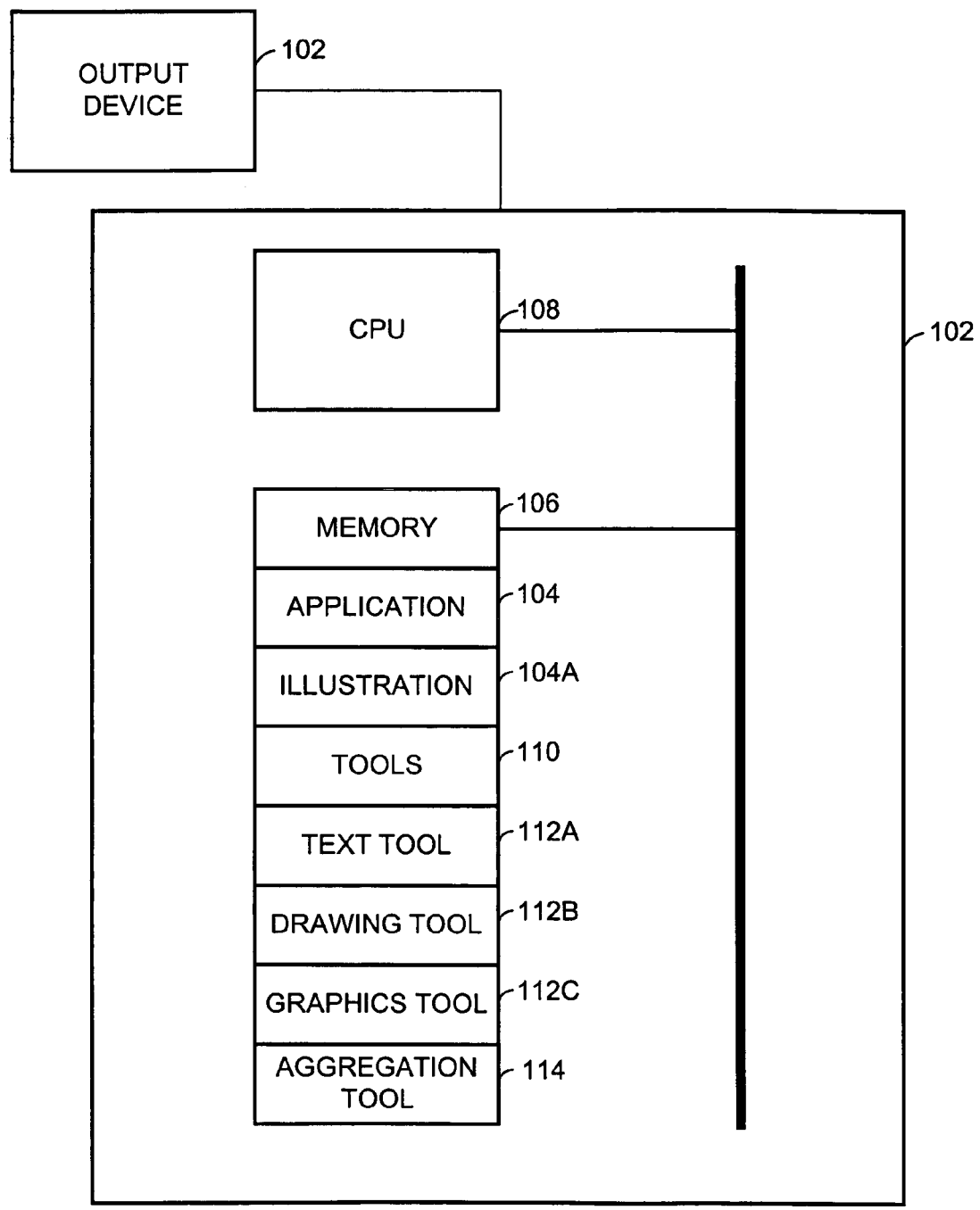
FIG. 1 is a block diagram of a computer system for creating illustrations in accordance with one aspect of the present invention.

FIG. 1 shows a computing system 100 for generating graphics for display or output on a conventional output device 102. The computing system 100 includes one or more computer program applications 104 stored in a memory 106 which can be executed by a general purpose processor (CPU) 108 to perform the methods described herein. In one implementation, an illustration application 104a is provided that can be invoked by a user to generate an electronic document (illustration) that can be displayed, printed or otherwise processed by output device 102. Illustration application 104a includes a user interface that allows a user to manipulate one or more tools 110 to generate, manipulate, display and output illustrations.

In one implementation, illustration application 104a includes plural tools 110 for creating original content or retrieving and manipulating content previously produced. In the implementation shown, illustration application 104a includes plural object generation tools including a text object tool 112a, a drawing tool 112b and graphics tool 112c. Each object generation tool can be manipulated to produce or retrieve an object for inclusion in an illustration. In addition, illustration application 104a can include an aggregation tool 114 for use in combining elements into an aggregation for inclusion in an illustration. The operation of the aggregation tool 114 is described in greater detail below in reference to FIG. 4.

Object Properties

Figure 2A:
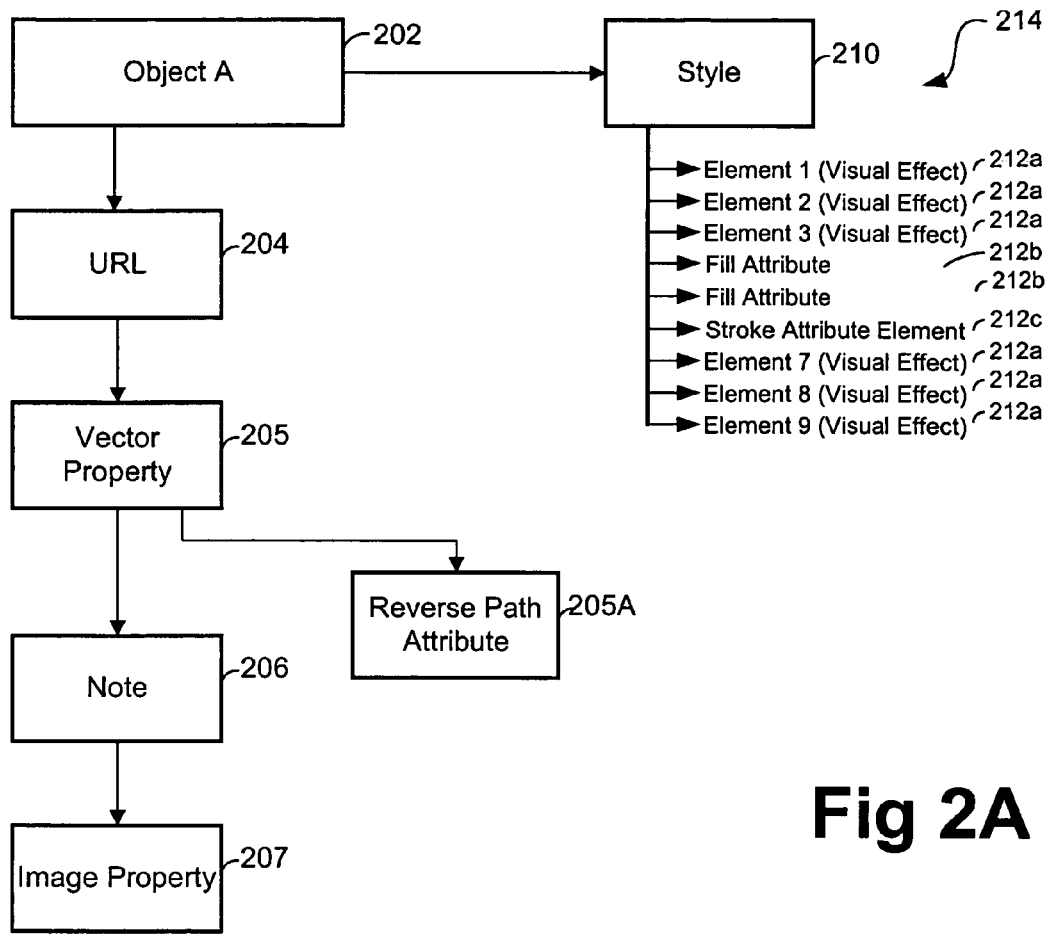
FIGS. 2A and 2B are a data structure for representing an object including its properties and an applied style in accordance with one aspect of the present invention.
Figure 2B:
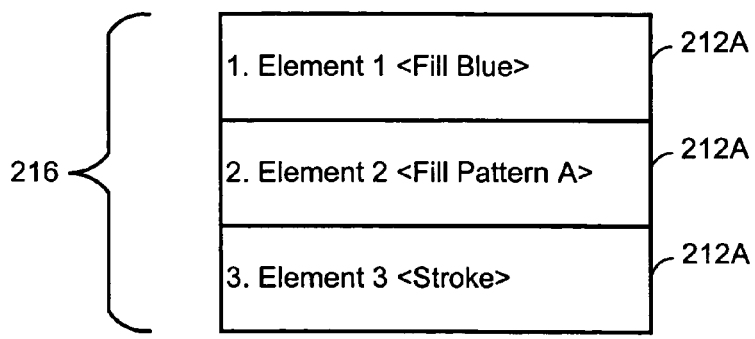

Each object has properties that can be manipulated through a user interface. As shown in FIG. 2a, each object 202 has one or more properties. Examples of properties include URL 204, vector property 205, note property 206, image property 207 and style 210. URL 204 can define a uniform resource locator (URL) associated with the object. Vector property 205 defines a path associated with the object. A textual note can be attached to the object using note property 206. If the object is an image, then the image data (e.g. RGB image data and alpha data) can be attached to the object as part of the image property 207 definition. Each property can have one or more attributes 205A (e.g., overprint attribute attached to the vector property 205).

A user can define and attach a style 210 to object 202. A style is a recipe that defines one or more operations to be performed on an object. When executed, a style receives as an input a representation of an object (and its associated properties) and produces as an output a representation of the object, which can be rendered to produce an appearance on an output device. The representation is distinct from the object.

That is, producing and possibly further manipulating the representation does not change the properties of the underlying object. In the implementation being described, the style is "live", meaning that after an object is edited, the style can be executed again to produce a new representation of the object.

A recipe 214 includes one or more elements 212. Elements can be selected from various effects including pre-paint effects, paint effects and post-paint effects. When the style is executed, the elements in recipe 214 are processed in accordance with an ordering. In one implementation, the elements are processed in sequential order where each element in the recipe receives as an input the output produced by its predecessor element in the order. More particularly, when the style is executed, the first element in the list receives as an input an object including its various properties (e.g., object 202) and produces as an output a representation of the object. Because the style is live, a copy of the original object is provided as an input when processing the first element in recipe 214 so as to maintain the integrity of the original object 202. When processing the second element in the recipe 214, the second element receives as an input the resultant representation of the object produced when executing the first element of the recipe and produces as an output a representation of the object.

Element 212 can be of various types. In one implementation, element 212 can be an effect 212A, a fill attribute element 212B, and a stroke attribute element 212C. Each element defines a visual effect. A visual effect is any operation that changes the visual appearance of an object without changing its underlying source data and that can be described in such a way that there is a recipe for applying it to any object of the appropriate kind, no matter what the shape or location of the object. This includes, but is not limited to, paint effects such as strokes and fills, vector effects such as zig-zag or scale operations, color blending effects and image effects. Fill attribute element 212B is an element that can be used to define a fill operation. Fill attribute 212B can itself include one or more effect attributes. Stroke attribute element 212C can be used to define a stroke operation. Stroke attribute 212C can itself include one or more effect attributes. The fill and stroke attribute elements have been separately identified here because they are subject to special treatment as described below.

Recipe 214 can include multiple fill attribute elements and stroke attribute elements. The recipe 214 can include a sequence 216 of consecutive fill-or-stroke attribute elements. (A "fill-or-stroke" attribute element is either a fill attribute element or a stroke attribute element.) When presented in a sequence 216 in recipe 214, the sequence 216 can be treated as a singular element for processing purposes. More specifically, when executing a sequence 216 of fill-or-stroke attribute elements, each element receives the same input representation of an object produced as a result of the execution of the immediately preceding element in recipe 214) and produces a resultant object. The resultant objects produced from executing each element in the sequence are aggregated to produce a representation that is passed as input to the next element in the recipe or that is the output of the recipe. A user can assign any number of fill-or-stroke attributes elements to a style. The final appearance of the object depends not only on the fills specified, but also on the order in which the user places them in an associated sequence 216 (e.g., the order of fill or stroke attribute elements define a paint order). Those of ordinary skill in the art will recognize that the recipe can include plural elements arranged and processed in series or parallel as described above in order to meet a particular implementation objective.

Figure 3:
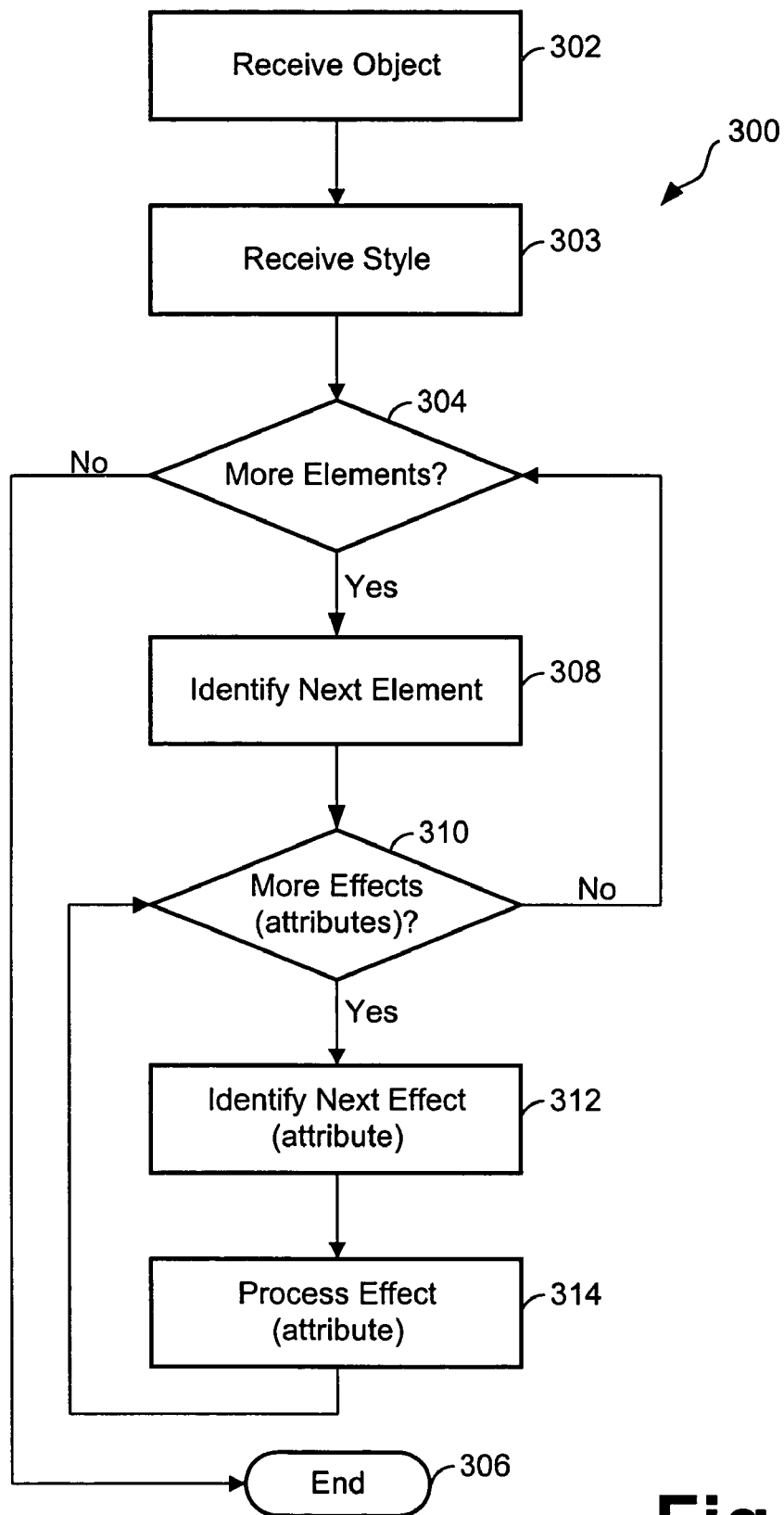
FIG. 3 is a flow diagram for a process for producing a renderable representation of an object.

FIGS. 2a and 3 show, a process 300 for producing a renderable representation of an object begins by receiving an object (step 302) and its style (step 303). A check is made to determine if any (other) elements of the style (recipe) are to be processed (step 304). If no more elements in the recipe remain to be processed at 304, the process ends (step 306), having produced a renderable representation of the object. The renderable representation of the object can be rendered by a render engine and displayed as appropriate. Otherwise, a next element is identified and processed (step 308).

Each element can include one or more attributes (effects). A check is made to determine if any other attributes associated with the current element are to be processed (step 310). If no more attributes remain to be processed the process continues with a next element in the recipe (step 304). Otherwise, a next attribute is identified (step 312) and processed (step 314).

Automatic Inference of Ordering

Elements can be placed in a recipe in any order. However, some effects can be identified as having a natural place in an order, and this identification can be used to assist a user building a recipe. For example, nearly all raster effects and color or transparency-modifying effects should be applied to an object after the object has been painted, because the color of the object is necessary as an input. Other effects, such as vector effects, vary as to when application will produce the results desired. As will be described, the ordering of elements and attributes in a recipe is inferred by the program from the types of effects proposed. More specifically, elements and attributes can include a default ordering. While a user has tremendous control over element order, many users prefer not to think about this when adding a visual effect to a recipe. However, if the results produced are not satisfactory, then the flexibility to change the ordering of the effects is desirable.

Accordingly, in one implementation of the present invention, each element that can be included in a recipe can be automatically placed into the recipe in accordance with a default characterization of the element. In one implementation, each element is characterized as a paint effect, a pre-paint effect, or a post-paint effect. Each category can optionally be further refined. For example, paint effects are classified as either fill effects or stroke effects, and an order is specified for each of these types of paint property attributes. Post-paint effects are classified as pre-rasterization effects, path-to-raster conversion effects, post-rasterization effects and transparency effects. A default ordering among these classes is defined. Pre-paint effects are classified as order sensitive or order insensitive.

In operation, when the user adds an effect to an object, the effect is automatically added at an appropriate location in the recipe according to the classification of the effect. As a user selects each effect, the effect is classified, or position information is obtained from the effect, and the effect is then placed into the recipe at an appropriate location.

Aggregation

In one implementation, illustration application 104A (FIG. 1) includes an aggregation tool 114. A user can use the aggregation tool 114 to produce one or more aggregations. An aggregation includes multiple items, such as simple objects, groups of objects, layers, or other aggregations. An aggregation can be named and can have its own style (an aggregation style or recipe). An optional element of an aggregation recipe is a placeholder element. A placeholder element identifies a time at which the style for an underlying item of the aggregation should be executed.

Figure 4:
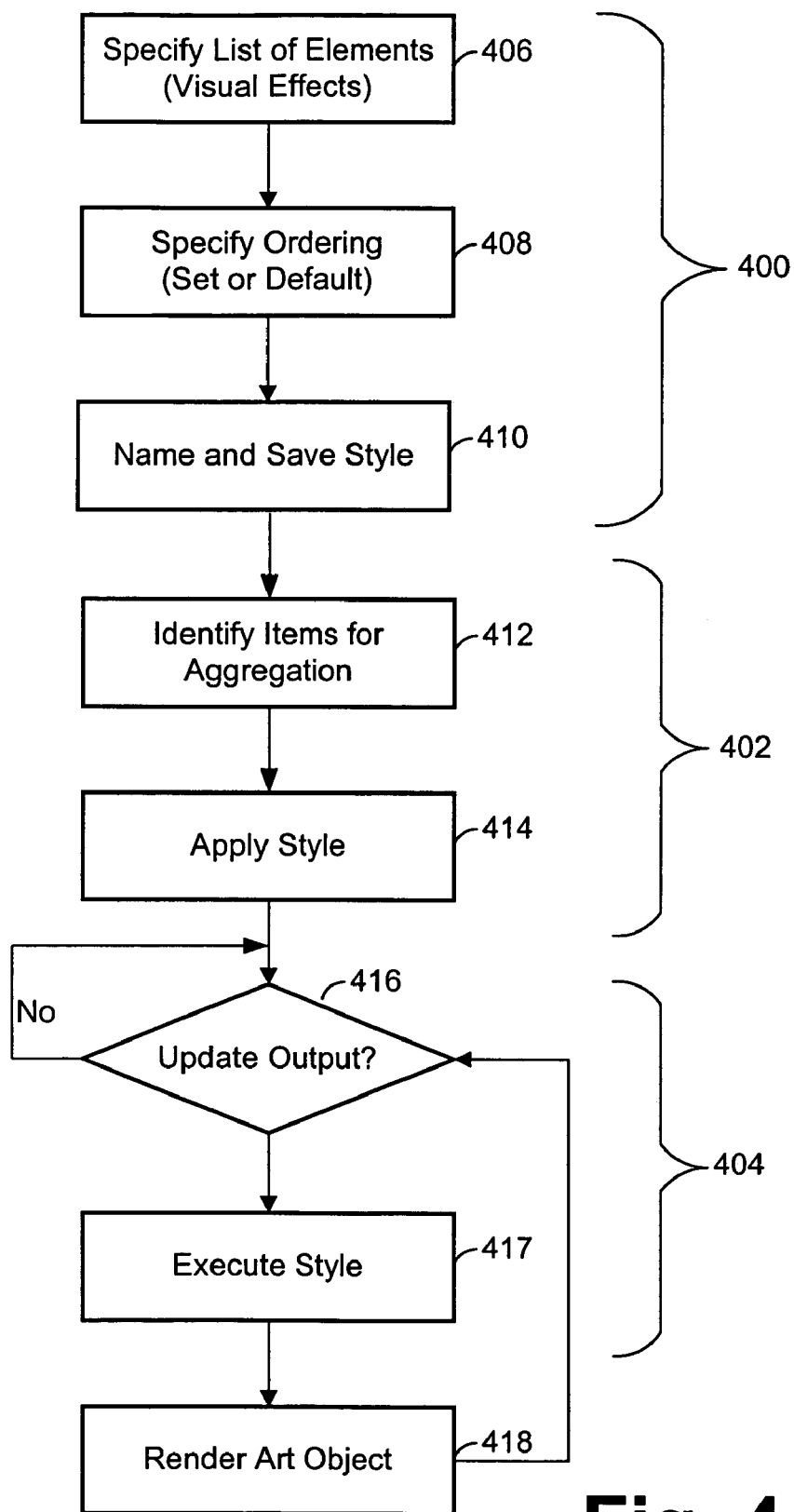
FIG. 4 is a flow diagram showing a process for generating an image that includes an aggregation where the process includes defining a style for the aggregation, grouping elements in the aggregation and rendering a representation of the aggregation.

FIG. 4 shows a process for creating an aggregation and applying an aggregation style to the aggregation to produce a representation of the aggregation. The process includes three parts: a creation phase 400, a specification phase 402 and a render phase 404. Initially, a user controls the creation phase 400 and specifies one or more elements (e.g., effects) for the aggregation recipe (step 406). The specification of elements can include the designation of one or more placeholders for specifying when the style of an individual item of the aggregation is to be applied during the style execution process. The operation and designation of placeholders are described in greater detail below. After or as the recipe of elements is created, an ordering for the application of the elements is defined (step 408). The ordering can be specified by the user, or can be inferred by the system from the type of effect using a default characterization scheme, as described above.

Some elements (e.g., effects) behave differently depending on whether they are applied to an aggregation as a whole or to its items individually (e.g., rotation). In one implementation, a predefined convention is implemented to distinguish when effects should be applied to the aggregation or the individual item. In one implementation, the following convention is applied: if the effect can make a change in transparency (such as opacity or blending mode) or is identified as a "live" effect, then the effect will be applied to the aggregation. A live effect defines an operation that receives as an input a representation of an object and produces as an output a new representation of the object without modifying the original properties of the object. Examples of live effects include drop-shadow and distortion. Those of ordinary skill in the art will recognize that live effects are similar to conventional filters in that a conventional filter defines an operation to be applied to an object producing as an output a renderable representation of the object. However, the application of a filter to an object destroys the original object. Whereas, the application of a live effect to an object allows a user to still edit the underlying original object. In one implementation, a live effect can be implemented by keeping a copy of the original object along with the renderable representation produced when applying a live effect to the original object.

If the element does not affect transparency or define a live effect, the element is applied to the individual items. In addition, if an element changes fill or stroke attributes where no aggregation fill or strokes have been defined, then the element is applied to the individual items. The convention can be used whenever a user selects an aggregation and applies a visual effect change or a named set of visual effect changes (a style).

After the ordering has been established, the aggregation style is named and saved (step 410). In one implementation, each document includes a list of any named styles. The named styles are saved to disk any time the document is itself saved. Each named style contains information about one or more visual effects that can be applied to art objects, including fill and stroke attributes and vector and stroke effects. For effects implemented by third party plug-in filters, the information included within a named style includes the name of the filter, a reference to the plug-in, and a parameter list for that filter.

The second phase 402 of the process includes applying an aggregation style to the aggregation. More specifically, one or more items are identified as included in the aggregation (step 412). The user attaches the style to the aggregation (step 414). When a user attaches a named style to an object or aggregation, the object or aggregation stores a reference to the named style. If the style is to be applied live, the object or aggregation subscribes itself as a listener to that named style. Those of ordinary skill in the art will recognize that a style can be applied in a non-live fashion (e.g. as a filter).

The final phase 404 includes executing the style and providing a visual output. More specifically, a check is made to determine whether the output needs updating (step 416). In one implementation, the output needs updating when a style is initially applied to an aggregation or changes are made to the style and when any changes are made to any item in an aggregation. Other conditions can prompt an update, for example, when one or more parameters associated with user preferences or the electronic document change. If the output needs updating, then the style is executed (step 417).

When a user redefines any properties (visual effects) of a named style through the user interface, such as the parameters for a specific vector or stroke effect, then the named style notifies any listeners that the style has changed. These listeners are the objects or the aggregations that contain a reference to the given named style. When an object or aggregation is notified that an associated named style has changed, the object or aggregation passes itself through the named style once again, which in turn generates new art that can be rendered and displayed.

In one implementation, the process of rendering includes attaching to each simple object in an aggregation a flag and a subordinate object that is the result of applying a visual effect to the source object. The flag indicates whether the visual effect has been applied and the visual appearance art generated and saved since the last time the user edited the object. When changes are made to the contents of an aggregation, appropriate flags can be set to indicate that items in the aggregation are invalid. At the time for display, if the appearance art is valid (flag not set) then the appearance art is displayed rather than re-executing a style and generating new appearance art for a given aggregation. If the art is not valid, then the aggregation style is reapplied to the aggregation, the appearance art generated and marked as valid (set flag). The appearance art is also regenerated if any other operation is performed that would require it to be valid (e.g., other non-rendering operations, such as asking the object what its visual bounding box is). In one implementation, memory can be conserved by not storing the appearance art (the renderable representation produced as a result of the execution of a style), because it can be easily generated from the source art (e.g., an aggregation) and the specified visual effect (e.g., the recipe).

Applying the Aggregation Style

As described above, the process of creating an aggregation style can include defining one or more placeholders. Each item in an aggregation can include a style. In one implementation, the aggregation style can include an election for designating at what point in processing (if any) the individual object properties should be applied. The placeholder can be undefined, such that the aggregation style overrides any individual item style (property definition). Alternatively, multiple placeholders can be specified and at each placeholder, the individual item style can be applied.

Figure 5:
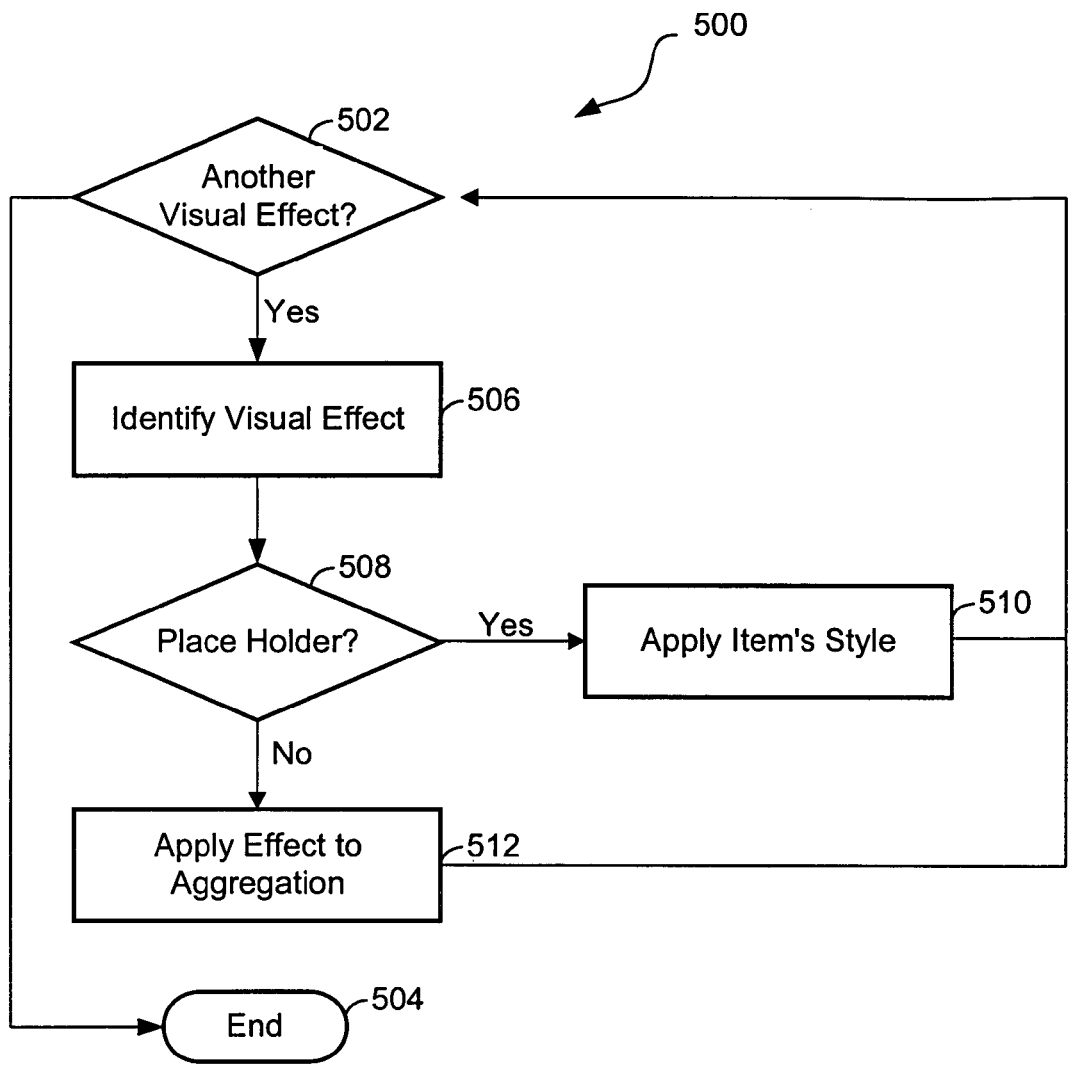
FIG. 5 is a flow diagram for a method of executing an aggregation style.

As shown in FIG. 5, a method 500 for executing an aggregation style to produce a renderable representation of the aggregation includes checking if another element (i.e., visual effect) in the aggregation recipe is specified (step 502). If none remain, the process ends (step 504). Otherwise, the next element (i.e., visual effect) is identified (step 506). The current element is checked to determine if it is a placeholder (step 508). If so, then the underlying style(s) associated with the item(s) in the aggregation is (are) applied (step 510). If the current element is not a placeholder, then the element (i.e., visual effect) is applied to the aggregation (either individually or in the aggregate depending on the visual effect) (step 512). Thereafter, the process continues at step 502.

In one implementation, each aggregation recipe includes a placeholder that is located in a default place in the sequence of elements in the aggregate recipe, either at the beginning of the aggregate recipe or the end. In one implementation, a priority indicator can be specified for each visual effect in an aggregation recipe or in a simple object style recipe. Depending on the priority level assigned to a visual effect, either the visual effect defined for the aggregation or the individual object definition can take precedence when applying an effect to an item.

In one implementation, the strict ordering for processing visual effects described above is slightly modified. That is, rather than applying the visual effects in strict order, the effects to be applied to an object (simple object or aggregation) are classified (as described above) and applied based on the classification level. In one implementation, all pre-paint effects are applied to an object (whether specified at the aggregate or individual level) prior to any paint effects or post-paint effects. In one implementation, the pre-paint effects for the aggregation are applied, followed by the pre-paint effects for the individual items, the paint effects for the aggregation, then the paint effects for the individual items. Other orderings based on type of effect irrespective of hierarchical level can be made.

For example, in one implementation, when generating a representation for a fill or stroke attribute, all pre-paint operations defined for an aggregation and any individual items are applied before any paint effects. Thereafter, all paint effects for both the aggregation and the individual items are in turn applied before any post-painting effects (for either the aggregation or the individual item) are applied.

User Interface

Figure 6:
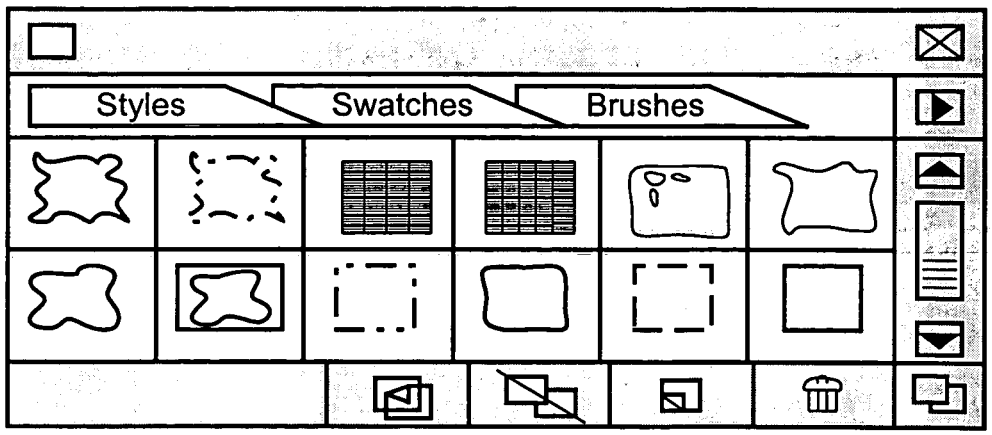
FIG. 6 is a diagram showing a user interface presented for an object style.
Figure 6:
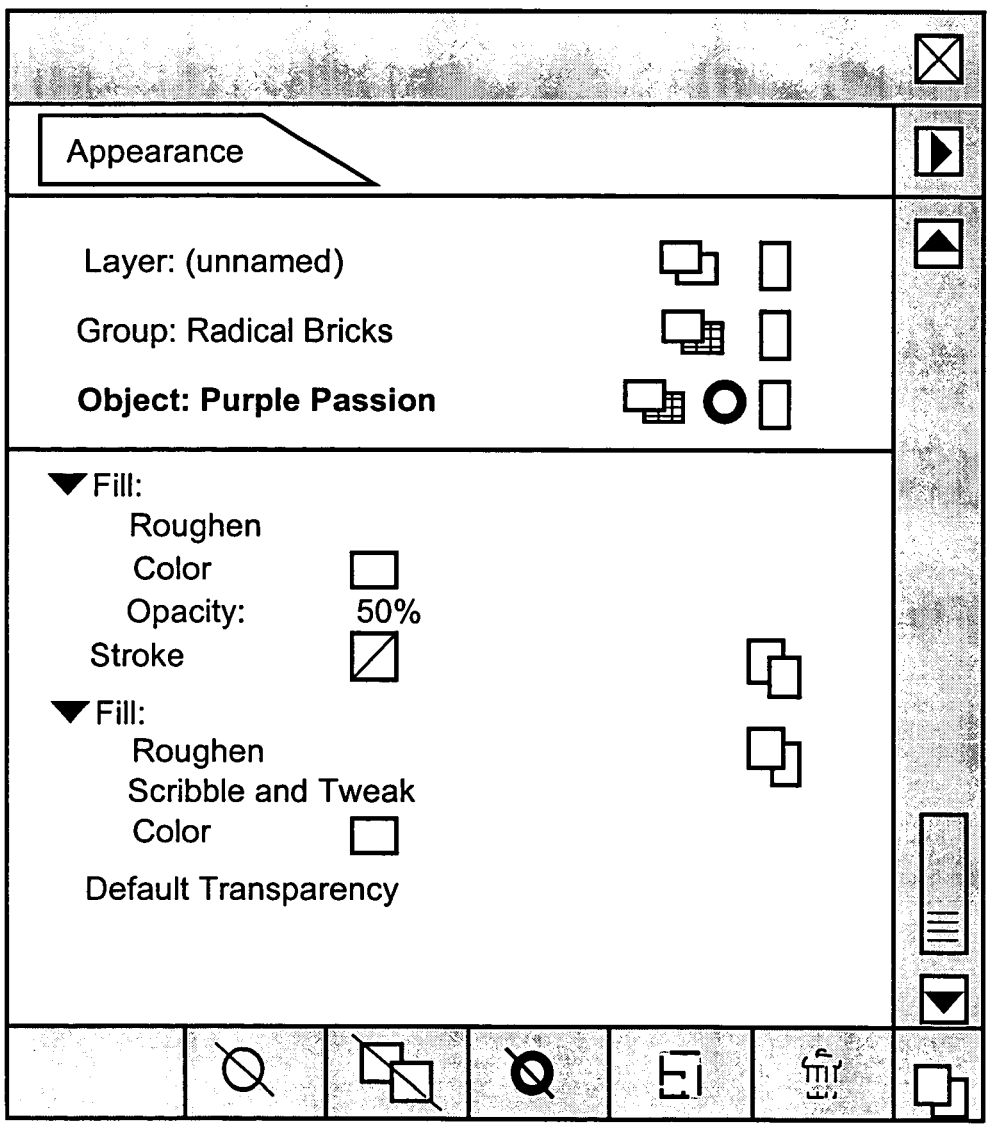
Figure 7:
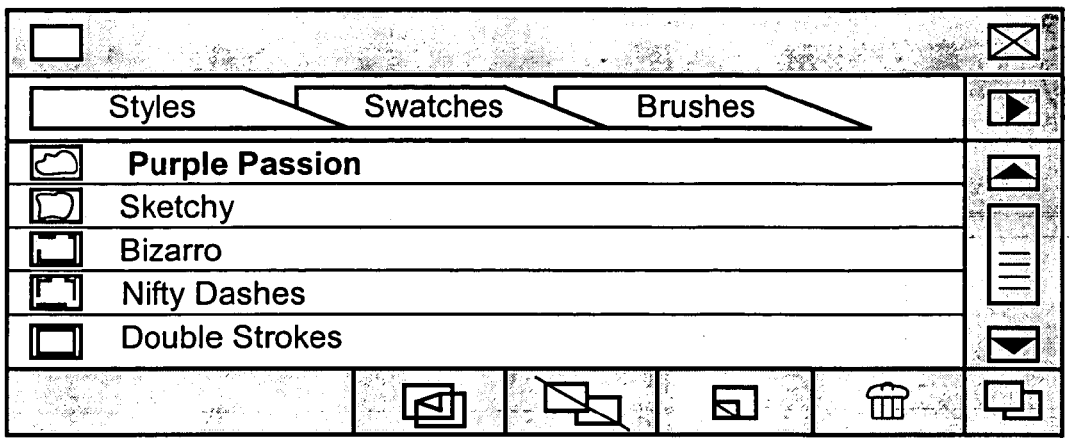
FIG. 7 is a diagram showing alternate view of a user interface presented for an object style.
Figure 7:
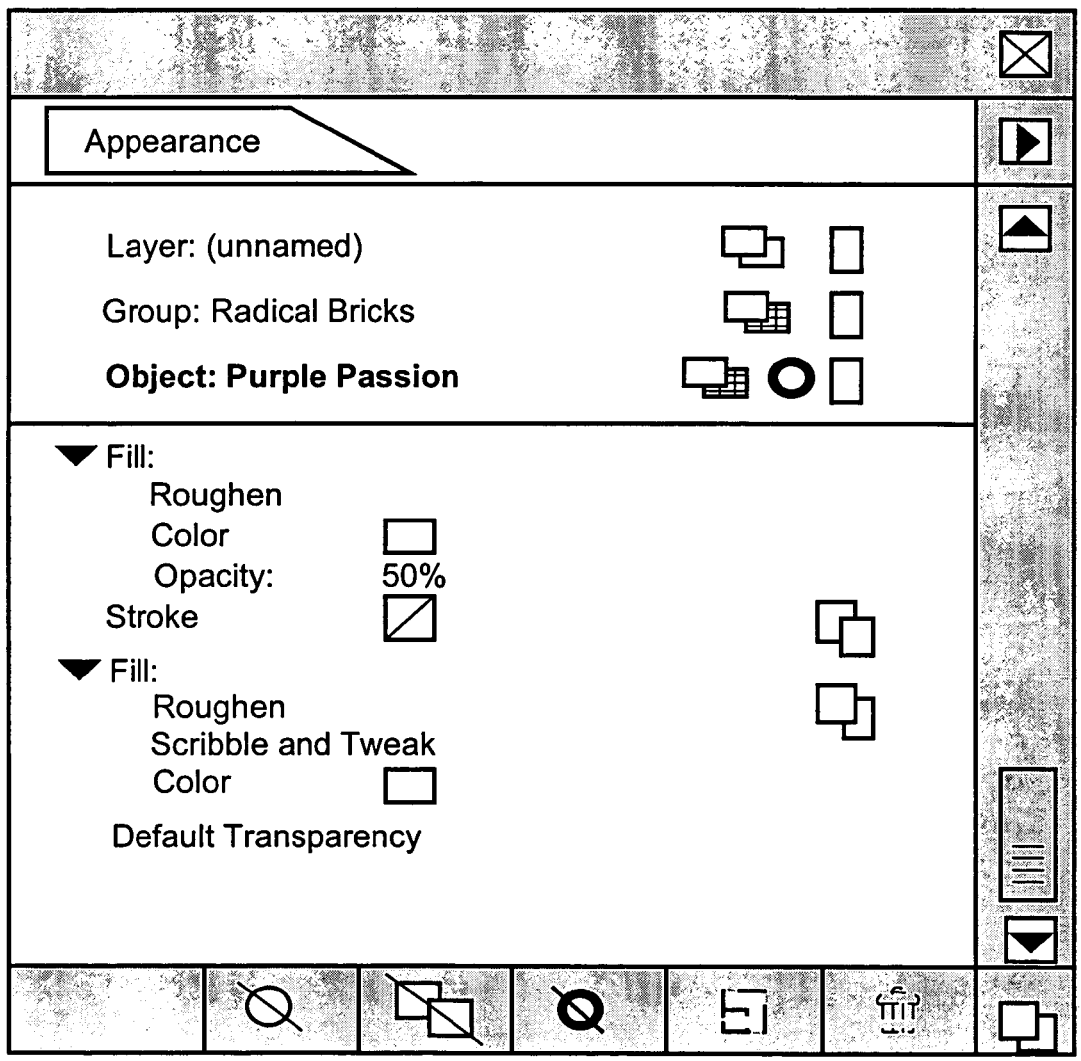

When aggregation definitions and individual object definitions have been created, the user interface can show the relationship of the various definitions. In one implementation, when an object is selected, the user interface displays a floating palette window as shown in FIGS. 6 and 7. In the window, the details of the object's style (property definition) are shown including the fill, stroke and transparency attributes of the paint property. In one implementation, the properties and attributes are shown in a list-like fashion. Above these properties, another list is provided that shows any parents (e.g., ancestors) of the selected object and any properties (properties, attributes, or styles) inherited from them. The two lists can be separated in the window.

The ancestors are container objects that contain the selected object, directly or indirectly. Optionally, not all of the aggregate ancestors are shown, only those that affect the appearance of the object selected.

Optionally, too, each individual effect can be selected in the window and properties modified as desired. When properties are changed, the program can automatically delete the previously generated subordinate objects (e.g., previously saved renderable representations of objects produced with the old recipe), apply the changed effects, save the new subordinate object representation, and display the results.

In one implementation, when an object is selected for editing, the original art is displayed for editing (using the original art for the object). In one implementation, the original art is displayed highlighted, and the user can edit the art using the full set of editing tools (text tool 112A, drawing tool 112B and graphics tool 12C of FIG. 1) provided with the illustration application.

Effect Application

In one implementation, each time an effect is applied to the original object, a subordinate object that includes the result of the effect is produced. In this way, plural effects can be applied to the original object without having to reproduce the original object after the first effect is applied. In addition, individual effects can be applied to the original object and then the results produced by the individual effects can be combined to produce a desired result. In the latter implementation, plural resultant objects can be temporarily stored prior to producing a final resultant object representation. Again, if memory space is limited, only the resultant representation can be stored in lieu of the intermediate representations.

In one implementation, as each visual effect is identified, the effect receives as an input the output produced from the previous visual effect, if any, or the original object if the effect is the first visual effect in a recipe, and any saved parameters. The system invokes the effect on the received input, and produces as an output a representation of the object that is passed as an input to the next effect. If no more effects are specified, then the final result is saved as a subordinate object and attached to the original art for the object.

Applications

The techniques described above can be applied in numerous contexts to provide optimal presentation results. For example, stroke or fill operations can be defined for objects that do not traditionally include these constructs. In this example, a stroke or fill can be defined for a group of objects and for image and mesh objects. A path can be automatically generated for the non-traditional objects and modified as appropriate. The generated path can be associated with the non-traditional object and can be automatically regenerated if the underlying image or mesh changes. In addition, the stroke or fill defined for the object (group) can be automatically changed if the user changes the stroke or fill attributes of the non-traditional object (image object or mesh).

In some applications, a user can exploit a paint style that includes multiple stroke or fill definitions. More specifically, when morphing between two objects having two different paint styles, a blended paint style for the intermediate objects can be produced as part of the morph. In one implementation, the intermediate object paint style includes two layers. The top layer is the fill style of one end object, and the second layer is the fill style for the other end object (in the morph). Varying the transparency of the top fill layer between fully opaque at one end (making the bottom layer invisible) and fully transparent at the other end (making the top layer completely invisible) can create a blended effect. Layers and layer processing techniques are described in more detail in copending United States patent application entitled "Layer Enhancements in Digital Illustration System" to Chris Quartetti, filed Dec. 22, 1999, Ser. No. 09/470,014, the contents of which are expressly incorporated herein by reference. A similar process can be used to blend two dissimilar stroke styles or any dissimilar paint styles.

What is claimed is:

1. A computer-implemented method of editing digital illustration graphics comprising:

identifying a plurality of objects to be included in an aggregation, one or more of the objects including an individual object style, a style being a grouping of one or more operations to be applied to individual objects or groups of objects to produce a renderable result, the operations including a set of pre-paint operations and a set of paint operations as modified by the pre-paint operations;

aggregating the plurality of objects;

defining an aggregation style separate and independent from each individual object style, the aggregation style having a set of pre-paint operations and a set of paint operations, the aggregation style also including one or more attributes that define a visual appearance of the aggregation, and each individual object style including one or more attributes that define a visual appearance of the corresponding object, wherein each object in the aggregation is associated with two separate and independent styles, the aggregation style of the aggregation and the individual object style corresponding to the object, and wherein defining the aggregation style includes identifying a time to apply the individual object style corresponding to an object in the aggregation in relation to a time the aggregation style is to be applied to the object in the aggregation;

applying the aggregation style by applying at least one of the pre-paint or paint operations of the aggregation style to a first object in the plurality of objects before applying the pre-paint or paint operations of the individual object style to the first object; and displaying a new representation of the plurality of objects in the aggregation.

2. The method of claim 1, wherein the action of applying the aggregation style comprises:
applying the pre-paint operations of the individual object style to the first object;
then applying the pre-paint operations of the aggregation style to the first object;
then applying the paint operations of the individual object style to the first object; and
then applying the paint operations of the aggregation style to the first object.

3. The method of claim 1, further comprising:
attaching an effect to the aggregation style of the aggregation, the effect being an operation that is applied to an object having a visual appearance defined by source data to change the visual appearance without changing the source data.

4. The method of claim 3, further comprising:
automatically applying the effect to the aggregation whenever the aggregation is edited.

5. The method of claim 3, further comprising:
substituting a content proxy for the effect, the content proxy operation representing a placeholder for one or more individual object styles of a corresponding object within the aggregation; and
performing the set of operations in order on the aggregation, including applying the content proxy operation at a time indicated by the order of the ordered set of operations.

6. The method of claim 5, further comprising:
modifying the position of the content proxy in the order of operations in the set in response to a user input.

7. A computer readable storage medium storing thereon computer executable instructions for editing digital illustration graphics, to cause a processor to perform operations comprising:
identifying a plurality of objects to be included in an aggregation, one or more of the objects including an individual object style, a style being a grouping of one or more operations to be applied to individual objects or groups of objects to produce a renderable result, the operations including a set of pre-paint operations and a set of paint operations as modified by the pre-paint operations;
aggregating the plurality of objects;
defining an aggregation style separate and independent from each individual object style, the aggregation style having a set of pre-paint operations and a set of paint operations, the aggregation style also including one or more attributes that define a visual appearance of the aggregation, and each individual object style including one or more attributes that define a visual appearance of the corresponding object, wherein each object in the aggregation is associated with two separate and independent styles, the aggregation style of the aggregation and the individual object style corresponding to the object, and wherein defining the aggregation style includes identifying a time to apply the individual object style corresponding to an object in the aggregation in relation to a time the aggregation style is to be applied to the object in the aggregation;

applying the aggregation style by applying at least one of the pre-paint or paint operations of the aggregation style to a first object in the plurality of objects before applying the pre-paint or paint operations of the individual object style to the first object; and displaying a new representation of the plurality of objects in the aggregation.

8. The computer readable storage medium of claim 7, wherein the action of applying the aggregation style comprises:
applying the pre-paint operations of the individual object style to the first object;
then applying the pre-paint operations of the aggregation style to the first object;
then applying the paint operations of the individual object style to the first object; and
then applying the paint operations of the aggregation style to the first object.

9. The computer readable storage medium of claim 7, operable to cause the processor to perform operations further comprising:
attaching an effect to the aggregation style of the aggregation, the effect being an operation that is applied to an object having a visual appearance defined by source data to change the visual appearance without changing the source data.

10. The computer readable storage medium of claim 9, operable to cause the processor to perform operations further comprising:
automatically applying the effect to the aggregation whenever the aggregation is edited.

11. The computer readable storage medium of claim 9, operable to cause the processor to perform operations further comprising:
substituting a content proxy for the effect, the content proxy operation representing a placeholder for one or more individual object styles of a corresponding object within the aggregation; and
performing the set of operations in order on the aggregation, including applying the content proxy operation at a time indicated by the order of the ordered set of operations.

12. The computer readable storage medium of claim 11, operable to cause the processor to perform operations further comprising:
modifying the position of the content proxy in the order of operations in the set in response to a user input.

13. A graphical processing system for editing digital illustration graphics, comprising:
a display device;
one or more processors; and
a computer-readable storage device, comprising instructions operable to cause the one or more processors to perform the following operations:

identifying a plurality of objects to be included in an aggregation, one or more of the objects including an individual object style, a style being a grouping of one or more operations to be applied to individual objects or groups of objects to produce a renderable result, the operations including a set of pre-paint operations and a set of paint operations as modified by the pre-paint operations;

aggregating the plurality of objects;

defining an aggregation style separate and independent from each individual object style, the aggregation style having a set of pre-paint operations and a set of paint operations, the aggregation style also including one or more attributes that define a visual appearance of the aggregation, and each individual object style including one or more attributes that define a visual appearance of the corresponding object, wherein each object in the aggregation is associated with two separate and independent styles, the aggregation style of the aggregation and the individual object style corresponding to the object, and wherein defining the aggregation style includes identifying a time to apply the individual object style corresponding to an object in the aggregation in relation to a time the aggregation style is to be applied to the object in the aggregation;

applying the aggregation style by applying at least one of the pre-paint or paint operations of the aggregation style to a first object in the plurality of objects before applying the pre-paint or paint operations of the individual object style to the first object; and displaying a new representation of the plurality of objects in the aggregation on the display device.

14. The system of claim 13, wherein the action of applying the aggregation style comprises:

applying the pre-paint operations of the individual object style to the first object;

then applying the pre-paint operations of the aggregation style to the first object;

then applying the paint operations of the individual object style to the first object; and then applying the paint operations of the aggregation style to the first object.

15. The system of claim 13, further comprising:

attaching an effect to the aggregation style of the aggregation, the effect being an operation that is applied to an object having a visual appearance defined by source data to change the visual appearance without changing the source data.

16. The system of claim 15, further comprising:

automatically applying the effect to the aggregation whenever the aggregation is edited.

17. The system of claim 15, further comprising:

substituting a content proxy for the effect, the content proxy operation representing a placeholder for one or more individual object styles of a corresponding object within the aggregation; and performing the set of operations in order on the aggregation, including applying the content proxy operation at a time indicated by the order of the ordered set of operations.

18. The system of claim 17, further comprising:

modifying the position of the content proxy in the order of operations in the set in response to a user input.

\* \* \* \* \*